(12) United States Patent
Pulis et al.

(10) Patent No.: US 9,979,735 B2
(45) Date of Patent: May 22, 2018

(54) DEVICES, METHODS AND SYSTEMS FOR SECURE DATA TRANSFERS

(71) Applicant: Deluxe Media Inc., Burbank, CA (US)

(72) Inventors: Chris Pulis, West Hills, CA (US); Ruopeng Wang, Santa Clarita, CA (US); Joel Bigley, Valencia, CA (US)

(73) Assignee: Deluxe Media Inc., Burbank, CA (US)

( * ) Notice: Subject to any disclaimer, the term of this patent is extended or adjusted under 35 U.S.C. 154(b) by 202 days.

(21) Appl. No.: 15/146,414

(22) Filed: May 4, 2016

(65) Prior Publication Data
US 2017/0324753 A1    Nov. 9, 2017

(51) Int. Cl.
*H04L 29/06* (2006.01)
*G06F 21/36* (2013.01)
*G06F 21/62* (2013.01)
*H04L 9/32* (2006.01)

(52) U.S. Cl.
CPC ............ *H04L 63/123* (2013.01); *G06F 21/36* (2013.01); *G06F 21/6218* (2013.01); *H04L 9/3239* (2013.01)

(58) Field of Classification Search
CPC ..... H04L 63/123; H04L 9/3239; G06F 21/36; G06F 21/6218

USPC ........................................................ 713/181
See application file for complete search history.

(56) References Cited

U.S. PATENT DOCUMENTS 6,230,241 B1 * 5/2001 McKenney .......... G06F 12/0879
                                                      711/118
2017/0083709 A1 * 3/2017 Simmons ............... G06F 21/602

* cited by examiner

*Primary Examiner* — Michael S McNally
(74) *Attorney, Agent, or Firm* — Dorsey & Whitney LLP

(57) ABSTRACT

Methods, systems and devices for securely transferring digital data from a first repository to a second repository are disclosed. Per at least one embodiment, a second repository is identified with a human recognizable identifier and an internal identifier associated with such second repository is determined. When a data transfer is desired, a work order associating the data to be transferred and identifying the second repository based on each of the human identifier and the internal identifier is generated. Such work order is utilized by a data port device to open normally closed communications port to accomplish the transfer of the data to the second repository when the identity of such second repository is confirmed by the data port device. A data integrity check confirms that only the designated to be transferred data was actually transferred to the second repository designated in the work order.

20 Claims, 2 Drawing Sheets

DEVICES, METHODS AND SYSTEMS FOR SECURE DATA TRANSFERS

TECHNICAL FIELD

The technology described herein relates to methods, systems and devices for securely transferring digital data from one storage medium to another.

BACKGROUND

Today, sensitive digital data such as videos, movies, sound recordings, financial information, health information, marketing data and other forms of information is often received, stored, transcoded and otherwise processed using digital data workflow systems. Often such data is transferred from a first storage medium or storage system to a second storage medium or storage system, hereafter such storage mediums, storage systems and other forms of devices and systems for storing digital data content are collectively referred to individually and collectively as a "storage repository" or "repository." Examples of such repositories include but are not limited to Network-Attached Storage (NAS) systems, Storage Area Networks (SAN), distributed file systems, shared-disk file systems, file servers, magnetic storage mediums such as hard discs, hard disc drives and magnetic tapes, optical storage mediums such as compact discs, digital versatile discs, and BLU-RAY™ discs, solid state semiconductor memory storage mediums such as flash drives and solid-state drives, and other forms of devices and systems for storing digital data.

Further, digital data in various types, forms and format can be processed using computer based systems. For example, audio-visual digital data content representing movies, videos or other entertainment properties can be processed using workflow system such as the DL3™ portal packaging and delivery platform provided by Deluxe Entertainment LLC of Burbank, Calif. Using such a workflow system, a first repository is typically co-located with and/or communicatively coupled to the workflow system. The digital data is processed and securely stored in the first repository. However, today, securely transferring desired digital data from a first storage repository to a second repository can often be problematic from a data security perspective. Commonly, the data ports used to transfer such data are open or can be opened without authorization. Such openness may expose a workflow computing system to, for example, hacker attacks and other internal and external threats. Such attacks may compromise the digital data stored in the first repository, including for example, by resulting in an early or unintended release of a given work. Likewise, once a port connected to a first repository and/or a workflow computing system is opened, controlling the actual data transferred from such first repository to one or more second repositories is often problematic. Third, once a port is opened, controlling the second repositories connected to such system such that only authorized devices or systems are connected to the first repository is problematic. Accordingly, needs exist for devices, methods and systems for securely transferring digital data from a first storage repository to a verified second storage repository and for verifying that only the designated digital data is actually transferred between such repositories.

Yet, today's workflow systems generally do not provide the desired level of security or ensure that all of the designated content to be transferred is transferred, that only the designated content is actually transferred, and the data transfer occurs to a pre-selected second repository that has been confirmed by both human and automated processes to be the designated second repository.

The information included in this Background section of the specification, including any references cited herein and any description or discussion thereof, is included for technical reference purposes only and is not to be regarded as subject matter by which the scope of the invention as defined in the claims is to be bound.

SUMMARY

Present embodiments are directed to methods, systems and devices for securely transferring data from a first repository to a second repository.

In accordance with at least one embodiment, a method, system and/or device for securely transferring digital data from a first repository to a second repository may include the operations, and/or persistent computer instructions instructing a suitably configured computing processor to perform the operations, of establishing a first communications link between a data port device and a computer system, wherein the data port device includes at least one communications port configurable for establishing a communications link between a first repository and a second repository. Such operations and/or computer instructions may also include those for receiving at the data port device a work order from the computer.

In accordance with at least one embodiment, the work order specifies an identifier associated with the second repository and identifies a set of digital data to be transferred from the first repository to the second repository.

Further, for at least one embodiment, methods, systems and devices for securely transferring digital data from a first repository to a second repository may include the operations, and/or persistent computer instructions therefor, of instructing a computer processor to perform the operations, of establishing a second communications link between a data port device and a second device and determining whether the second device is the second repository identified in the work order.

Further, for at least one embodiment, when the result of the determining indicates that the second device is the second repository, the operations and/or persistent computer instructions therefor may include establishing a third communications link between the data port device and the first repository and opening the at least one communications port in the data port device to establish a communications path between the first repository and the second repository. For at least one embodiment, such communications path may include use of a second communications link, connecting a data port device to a second repository, and use of a third communications link, connecting data port device to a first repository.

For at least one embodiment, methods, systems and devices for securely transferring data from a first repository to a second repository may include the operations, and/or persistent computer instructions therefor, of transferring a set of digital data from a first repository to a second repository via the communications path established by and between each repository and a data port device.

For at least one embodiment, methods, systems and devices for securely transferring data from a first repository to a second repository may include the operations, and/or persistent computer instructions therefor, of determining whether data transferred from the first repository to the second repository satisfies a data integrity requirement.

In accordance with at least one embodiment, methods, systems and devices for securely transferring data from a first repository to a second repository may include use of a work order that specifies at least one first identifier is associated with the second repository.

In accordance with at least one embodiment, methods, systems and devices for securely transferring data from a first repository to a second repository may, when a first identifier is associated with the second repository, may include the operations and/or persistent computer software instructions therefor of determining whether the second device is the second repository. In accordance with at least one embodiment, such determination may occur by querying the second device for a device identifier, comparing the at least one first identifier specified in a work order with the device identifier returned by the second device in response to the querying, and when the at least one first identifier specified in the work order matches the device identifier returned by the second device in response to the querying, recognizing the second device as the second repository designated in the work order.

In accordance with at least one embodiment, methods, systems and devices for securely transferring data from a first repository to a second repository may include use of at least one first identifier which comprises an internal identifier associated with a second repository.

In accordance with at least one embodiment, methods, systems and devices for securely transferring data from a first repository to a second repository may include use of a serial number as first identifier for a second repository.

In accordance with at least one embodiment, method, systems and devices for securely transferring data from a first repository to a second repository may include use of a serial number that is hard coded into the second repository so as to be unmodifiable and may be used as a first identifier for the second repository.

In accordance with at least one embodiment, methods, systems and devices for securely transferring data from a first repository to a second repository may include use of a work order that specifies at least one second identifier associated with a second repository. Further, for at least one embodiment, an operation of determining whether the second device is the second repository may include the operations of querying the second device for a second device identifier, comparing the at least one second identifier specified in a work order with the second device identifier returned by the second device in response to the querying, and when each of the at least one first identifier specified in the work order matches the first device identifier returned by the second device and the at least one second identifier specified in the work order matches the second device identifier, as returned by the second device in response to the querying, recognizing the second device as the second repository designated in the work order.

In accordance with at least one embodiment, methods, systems and devices for securely transferring data from a first repository to a second repository may include use of at least one second identifier that includes a first human recognizable identifier.

In accordance with at least one embodiment, methods, systems and devices for securely transferring data from a first repository to a second repository may include the operation and/or persistent computer software instructions therefor of querying the device for a second device identifier by performing at least the operation of scanning the second device for a second human recognizable identifier.

In accordance with at least one embodiment, methods, systems and devices for securely transferring data from a first repository to a second repository may include use of both a first human recognizable identifier and a second human recognizable identifier, where the first and second human recognizable identifiers are the same and comprise at least one of a bar code, a quick response code and a radio frequency identification tag.

In accordance with at least one embodiment, methods, systems and devices for securely transferring data from a first repository to a second repository may include use of a second repository configured as a hard disc drive.

In accordance with at least one embodiment, methods, systems and devices for securely transferring data from a first repository to a second repository may utilize, at least in part, a workflow computing system.

In accordance with at least one embodiment, methods, systems and devices for securely transferring data from a first repository to a second repository may include use of a second direct, hard-wired communications link between a data port device and a second device.

In accordance with at least one embodiment, methods, systems and devices for securely transferring data from a first repository to a second repository may include the operation and/or persistent computer software instructions therefor of determining whether data transferred from the first repository to the second repository satisfies a data integrity requirement by calculating a pre-transfer cryptographic hash function for the set of digital data to be transferred as such set of digital data is stored in the first repository prior to transfer, calculating a post-transfer cryptographic hash function for the set of digital data post transfer of the set of digital data to the second repository, comparing the pre-transfer cryptographic hash function with the post-transfer cryptographic hash function, and when the comparison of the pre-transfer and post-transfer cryptographic hash functions match, closing the at least one communications port in the data port device.

In accordance with at least one embodiment, methods, systems and devices for securely transferring data from a first repository to a second repository may include use of a pre and post transfer cryptographic hash functions that is calculated using, for example, an MD-5 message digest algorithm.

In accordance with at least one embodiment, methods, systems and devices for securely transferring digital data from a first repository to a second repository include the operations and/or persistent computer software instructions therefor of receiving a second repository into a repository library, marking the second repository with a human recognizable identifier, determining an internal identifier associated with the second repository and registering the second repository in a database, wherein the database identifies the second repository using the human recognizable identifier and the internal identifier.

Additionally such operations and/or persistent computer software instructions may include communicating the database to a workflow computing system, selecting, using the workflow computing system, the second repository as a destination for a transfer of a set of digital data from a first repository, establishing a first communications link between a data port device and the workflow computing system, wherein the data port device includes at least one communications port configurable for establishing a communications link between the first repository and the second repository and receiving at the data port device a work order from the workflow computing system, wherein the work order specifies the second repository based on the human recognizable identifier and the internal identifier associated therewith in the database, and the work order identifies the set of digital data to be transferred from the first repository to the second repository.

Additionally upon receiving of such a work order the operations and/or persistent computer software instructions therefor may include establishing a second communications link between the data port device and a second device, determining whether the second device is the second repository identified in the work order.

Additionally, when the result of the determining result in an identification of the second device as the second repository, such operations and/or persistent computer software instructions therefor may include establishing a third communications link between the data port device and the first repository, opening the at least one communications port in the data port device to establish a communications path between the first repository and the second repository, wherein the communications path includes the second communications link and the third communications link, transferring the set of digital data from the first repository to the second repository via the communications path, and determining whether data transferred from the first repository to the second repository satisfies a data integrity requirement.

In accordance with at least one embodiment, methods, systems and devices for securely transferring digital data from a first repository to a second repository may include the operations and/or persistent computer software instructions therefor of determining whether a second device is a second repository identified in a work order by querying the second device for an internal identifier, and comparing the internal identifier returned by the second device with the internal identifier specified in the work order.

In accordance with at least one embodiment, methods, systems and devices for securely transferring digital data from a first repository to a second repository may include the operations and/or persistent computer software instructions therefor of determining whether a second device is the second repository identified in a work order by querying of the second device for a human recognizable identifier, comparing the human recognizable identifier returned by the second device with the human recognizable identifier specified in the work order, and identifying the second device as the second repository when the internal identifier and human recognizable identifier returned by the second device match the internal identifier and human recognizable identifiers specified in the work order.

In accordance with at least one embodiment, methods, systems and devices for securely transferring digital data from a first repository to a second repository may include the operations and/or persistent computer software instructions therefor of using a human recognizable identifier used to mark the second repository, where such human recognizable identifier comprises at least one of a bar code, a QR code and an RFID tag.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

DETAILED DESCRIPTION

The various embodiments of the present disclosure solve the above described need for methods, systems and devices for securely transferring digital data from a first storage repository to a second storage repository. As described in greater detail herein, in accordance with at least one embodiment, the various method, system and device embodiments described herein provide a multi-faceted approach to securing digital data transfers from a first repository to one or more second repositories using commonly available communications mediums including but not limited to direct file transfers, networked file transfers and others.

Figure 1:
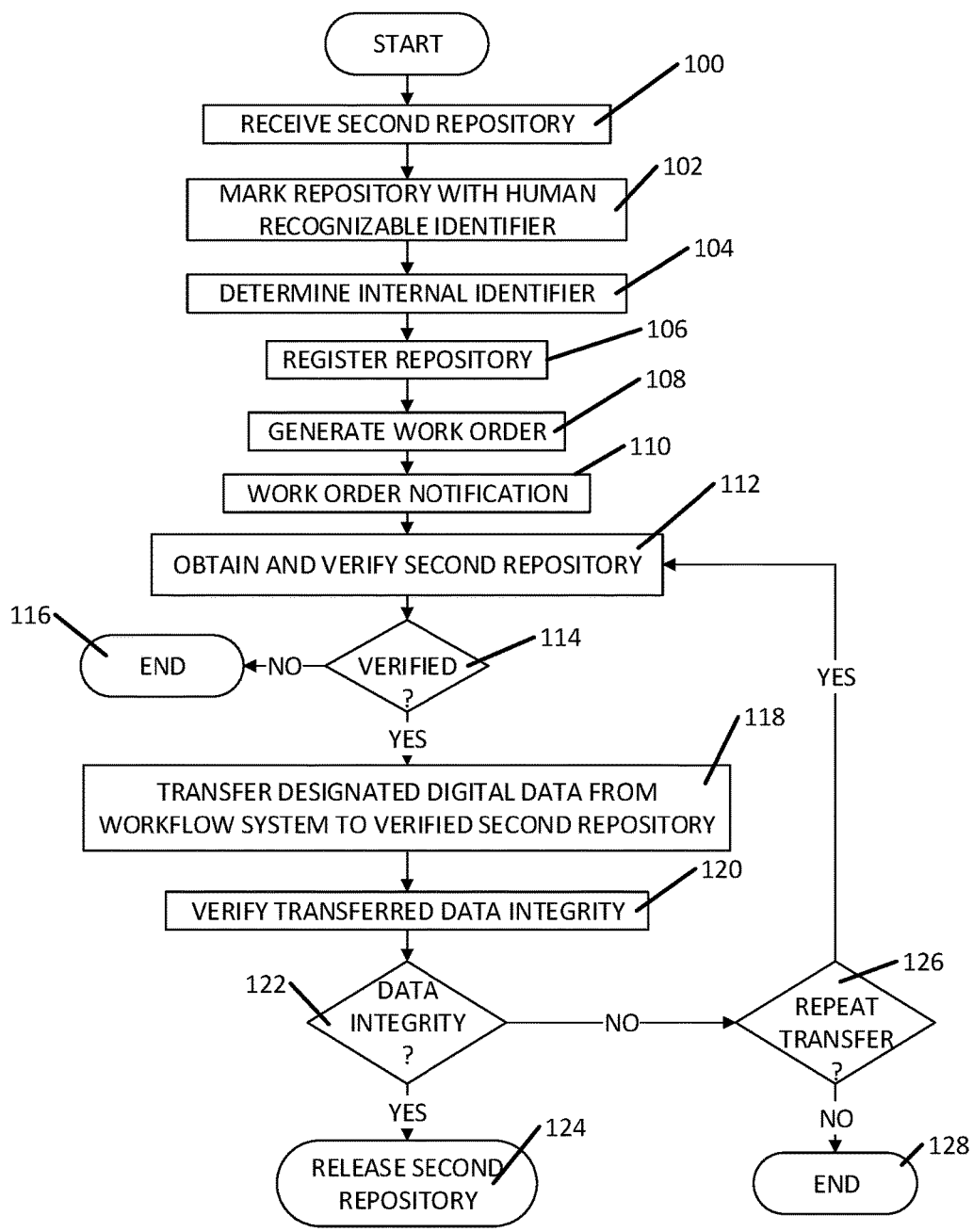
FIG. 1 is a flow chart depicting one embodiment of a method for securely transferring digital data from a workflow computing system to a second repository.

As shown in FIG. 1, a method for securely transferring digital data content per at least one embodiment is disclosed. Per Operations 100-106, one or more of the embodiments described herein includes a pre-identification and pre-determination of one or more storage repositories that may be used as a second repository. More specifically, and in accordance with at least one embodiment, a second repository is first received (Operation 100) by a workflow or other computing system, herein workflow computing systems and computing system in general are commonly referred to as a "workflow computing system." As discussed in greater detail below, a workflow computing system may utilize any desired combination of hardware and software to facilitates the operations described herein.

A repository may be received by a workflow computing system in any form, for example in the case of a repository provided in the physical form of a hard disc drive, a physical and tangible device may be received by the workflow computing system or by a library of digital data repositories available for use in conjunction with the workflow computing system. Contrarily, in the case of a NAS or similar storage system, a portion of such system may be allocated to a given workflow system for use thereby. Such allocation may occur exclusively or on a partitioned or other basis. The allocation of NAS and other digital data storage systems to workflow computing systems for use by such workflow computing systems to store and transfer data is well known in the art and beyond the scope of the present disclosure. Any storage system allocation systems and methodologies may be used in conjunction with the various embodiments described herein, as desired for any given implementation thereof.

Per Operation 102, the received repository is marked or otherwise identified with a human recognizable identifier. The repository may be marked with a human recognizable identifier in any desired manner, for example, by affixing a label to the repository, noting in a database or other listing a location (for example in a storage rack) of the repository, or otherwise marking the repository. The human recognizable identifier is desirably an identifier which a human operator may recognize, at a later time, without requiring disassembly of the repository. For any given embodiment, the human recognizable identifier need not be, but, may be, readable by a human. For example, a Quick Response (QR) code is commonly recognizable by a human but not readable by a human without the use of a reading device. Similarly, a human recognizable identifier may be provided in an encrypted form, where a string of two or more characters are humanly recognizable, but the information conveyed by such characters is not humanly understandable without the use of decrypting devices.

For at least one embodiment, a human recognizable identifier may be configured to enable a human operator, with or without the use of a reading device, to gain knowledge about one or more characteristics of a given repository. For example, such characteristics may include storage capacity, storage mechanism, data read and write rates or others. For at least one embodiment, such characteristics of a given repository can be ascertained without having to access circuitry or information stored internally in or by the repository. For at least one embodiment where a repository includes one or more components of a NAS, SAN or other digital data storage system, where such system may be centralized or distributed, the human recognizable identifier can be accessed by a human, with or without a reading device, without removing the given repository from a storage rack or other storage location, disassembly of the repository or taking other invasive actions.

In accordance with at least one embodiment, the human recognizable identifier may include identification information readable, in whole or in part, by a human, by a reading device utilized by a human, or based on a combination of a human and a reading device utilized by a human. For at least one embodiment, the human recognizable identifier may include information available only to an operator of a workflow computing system. Examples of such human and machine recognizable identifiers include but are not limited to bar codes, QR codes, Radio Frequency IDentification (RFID) tags and other identifiers well known in the art.

In at least one embodiment, a repository received by or otherwise made available for use by a workflow computing system may be pre-marked with a human recognizable identifier. For example, a repository configured in the form of a hard disc drive may be provided by its manufacturer with a label, RFID tag or other human recognizable identifier. Such human recognizable identifier may be affixed to an external casing of such drive, for example, with a label providing human recognizable identification information, or provided internally with an RFID code or similar identifier providing information to a human via use of a compatible reading device.

For at least one embodiment, instead of or in addition to the combination of the human readable identifier and the internal identifier verifications, it is to be appreciated that other combinations of identifiers may be utilized, including the use of one or more automated verifications only. For example, in addition to an internal identifier verification, a second identification may involve a writing of uniquely identifying data into the second repository during, for example, Operation 102 and using this uniquely identifying stored data as a second identifier for the second repository in a given work order.

Per Operation 104, the process of pre-identifying and pre-determining one or more storage repositories that may be used as a second repository may include for at least one embodiment the operations of determining a repository's internal identifier. An internal identifier may take any of various forms including for example a device's serial number, where the serial number may be hard coded into the repository's read only memory, a unique (fixed and not modifiable) collection of device characteristics, unique cryptographic hash values, or other machine readable identifiers. For at least one embodiment, such internal identifier is fixed and cannot be modified. A repository's internal identifier may be accessed using any available repository interpreter, where it is commonly known and appreciated that any given repository may require a unique interpreter to access internally stored information. Per at least one embodiment, two or more internal identifiers or two or more human recognizable identifiers, may be used to identify any given second repository. Per at least one embodiment, two or more internal identifiers may be used in lieu of, or in addition to, one or more human recognizable identifiers to uniquely identify any given second repository.

Per Operation 106, for at least one embodiment, the process of pre-identifying and pre-determining one or more storage repositories that may be used as a second repository for a future digital data transfer may include the operation of registering the repository in a database, a listing or otherwise (hereafter, a "second repository database") making known to one or more given workflow systems the availability of a given second repository. Such second repository database may include, when available or used for any given embodiment, a human readable identifier and an internal identifier uniquely identifying the second repository. A type of reading device, if needed, for obtaining information from any human recognizable identifier and/or any software databases, files or other information needed to obtain information from any internal identifiers may be specified in the database. For one or more embodiments, one or more characteristics of a given second repository may also be included in the database or other listing of available repositories.

For at least one embodiment, the above described pre-determination and pre-identification may occur before any digital data transfer from a first repository to a second repository occurs. In at least one other embodiment, the identification of a second repository may arise on an as needed, as requested, on-demand or other basis. For at least one embodiment, the pre-determination and pre-identification of a second repository occurs prior to a workflow computing system designating a given set of digital data is to be transferred to a given second repository. For embodiments wherein large data sets are to be transferred, it is to be appreciated that such digital data set may be separated into two or more sub-sets of digital data, with two or more authorized second repositories being identified and designated as corresponding to a given sub-set of data.

Per Operation 108, when the time arises for a transfer of digital data from a first repository to a second repository, the workflow computing system generates a work order. The work order may include a selection, from the second repository database, of a second repository to which the desired transfer of given digital data is to occur. The work order may also initiate one or more computing processes by which the selected second repository is reserved and associated with, or otherwise logically bound to, the desired digital data to be transferred per the work order. It is to be appreciated that the generation of the work order and binding of a second repository with the given set of digital data to be transferred may occur in view of the quantity, type or other characteristic of the digital data to be transferred, the destination for the data, the characteristics of the second repository, whether the transfer is a single transfer or a transfer of two or more instances of the digital data to two or more second repositories, whether the transfer is a one-time transfer or a transfer to be repeated on a scheduled, periodic or other basis (as may arise, for example, in an initial limited transfer of digital data to a content distribution network (CDN) followed by a subsequent transfer of additional instances of the digital data to other second repositories associated with a given CDN when the desirability for the given set of digital data necessitates the providing of additional copies of such digital data on the CDN), or any other factor. In accordance with at least one embodiment, the generation of a work order is accomplished using manual, semi-automated or automated processes provided by the workflow computing system. In accordance with at least one embodiment, the work order includes both the human readable identifier and the internal identifier.

The selection from the second repository database of a pre-determined and pre-identified repository to be a designated second repository for a given digital data transfer may be initiated by and/or arise under the control of a human operator using one or more workflow computing system input and display devices based upon prompts and user input fields provided by or on one or more computer display interface screens. The human operator initiating a work order may be the same or different than, local or remote to, an operator under whose guidance, control or direction a processing of the digital data using the workflow computing system has occurred. In other embodiments, the selection of the second repository may occur by a human and/or automatically by an operator that has not processed the digital data to be transferred using the workflow computing system. That is, per at least one embodiment, the roles and responsibilities for digital data processing and digital data transfers may be combined or separate and performed by humans with or without automated processes or automatically without human intervention.

It is to be appreciated that these operations may occur over any span of time including real-time. For example, a second repository may be selected and bound to the digital data while processing of such data is on-going. Likewise, a second repository may be bound to a work order, hours, days or even weeks before the actual desired transfer of such digital data to the second repository occurs. Data transfer operations may be queued, batched or otherwise processed, with the selection and reservation, if any, of one or more second repositories arising at any time as desired for a particular implementation of one or more of the embodiments discussed herein. For example, a second repository may be reserved when a data transfer is first queued. For another embodiment, a second repository may be reserved at any later time, such as, when a transfer of data previously queued for transfer actually occurs.

The selection of the second repository may also include, for at least one embodiment, associating the given digital data desired to be transferred with the selected second repository. That is, per at least one embodiment, the instantiation of the digital data to be transferred is bound to the selected second repository. It is to be appreciated that the instantiation of the digital data to be transferred may be the original data, a version of such digital data, an authorized copy of such digital data, a portion of a digital data file, or otherwise. It is to be appreciated that the digital data to be transferred from the first repository to the selected second repository may be identifiable in its entirety, or in one or more components parts thereof, by using well-known data integrity approaches such as cryptographic hash functions, checksums, and others. That is, per at least one embodiment, one or more identifying characteristics of the digital data selected to be transferred may be known and determinable prior to a transfer of such digital data begins.

At the time which the desired transfer of the digital data to the selected second repository to which the digital data has been bound occurs, for at least one embodiment, at least one human and at least one automated verification is accomplished prior to the data transfer to the second repository occurs. For example, using a suitably equipped reading device, a human operator verifies that the selected second repository has been configured and is ready to receive the digital data. An automated verification of the second repository may also be accomplished. It is to be appreciated that these verifications may occur in any order and even simultaneously. These verifications may utilize any know or future existing technologies or combinations thereof which facilitate either one or both a human and an automated verification of a human recognizable identifier and an internal identifier that a pre-selected second repository is available and ready to receive pre-bound digital data designated for transfer to such pre-selected second repository. When two or more human recognizable and/or internal identifiers are used to identify the second repository to the database during Operations 102-106, it is to be appreciated that such two more identifiers are identified in the work order generated per Operation 108.

Per Operation 110, a notification of the work order generated per Operation 108 is communicated to the human operator, or in the case of automated processes to an automated system or devices responsible for retrieving and or establishing access to the second repository designated in the work order from the library. The work order notification may be communicated by any desired and compatible communications system including but not limited to text messaging, instant messaging, voice messaging, email, bulletin board posting, command or otherwise. Per at least one embodiment, each work order includes a work order identifier, which commonly may be a combination of one or more numbers and/or other characters. The work order identifier may include a second human recognizable identifier.

Per Operation 112, the second repository designated in the work order is obtained and verified. The process of obtaining the designated second repository may vary based on the type and location of the second repository relative to the workflow computing system. In accordance with at least one embodiment, the second repository is, for example, a hard disc drive that is physically located local to the workflow computing system used to process the digital data to be transferred. Obtaining of such a second repository correspondingly may include the operation of retrieving the hard disc drive from a library or other storage location and connecting the second repository to the workflow computing system via a data port device directly or indirectly, for example, over a local area network or similar local connection.

In accordance with at least one embodiment, a data port device used to connect the workflow computing system to the second repository may be instantiated as a physical device, a component of the workflow computing system, a virtual device existing in software which uses pre-existing data ports on a given workflow computing system or otherwise. Examples of such commonly known digital data ports which may be used as a data port device include but are not limited to SCSI, Universal Serial Bus, Digital Video, serial, parallel, Ethernet and other ports.

In accordance with at least one embodiment, the second repository may be located remote from the workflow computing system such that a direct communicative connection between the second repository and the workflow computing system is not possible. Per such an embodiment, obtaining the designated second repository may include the operations of connecting the second repository to a data port device and establishing a communicative connection between the workflow computing system and data port device, where the data port device is remote to the workflow computing system but proximate to the second repository. It is to be appreciated that such a communicative connection may include the use of any desired form of connections and data security protocols including but not limited wide area networks, virtual private networks, encrypted data communication links and otherwise.

For at least one embodiment, a transfer of an extremely large data set, may utilize multiple parallel transfers to multiple second storage repositories. One or more of such data sets may be transferred from one or more first repositories to one or more selected second repositories using one or more of various existing or future arising digital data delivery systems. Examples of such digital data delivery systems include, but are not limited to, ASPERA™, provided by Aspera Inc. of Emeryville, Calif., FILE CATALYST DIRECT™ provided by File Catalyst Inc. of Ottawa, Ontario, Canada, and MEDIA SHUTTLE™, provided by Signiant of Lexington, Mass. Other network based digital data delivery systems may also be used alone or in combination and as desired for any particular implementation of one or more of the described embodiments.

In accordance with at least one embodiment, the transfer of the digital data to a second repository may occur using a hard drive device or similar device which uses optical, magnetic, electrical, or other recording technologies. In at least one embodiment, the second repository may be fixed or portable, removable or irremovable, or directly or indirectly connected to workflow computing system, the first repository or both. Such communicative connections by and between a second repository may utilize any known or future arising communications topologies or combinations thereof including but not limited to, wired, wireless, local networks, remote networking, virtual private networks, peer-to peer, token ring, wide-area-networks, internets, intranets, serial connections, parallel connections, or others.

In accordance with at least one embodiment, the obtaining of the designated second repository may involve the operations of a human or automated operator binding, associating or otherwise logically selecting the designated second repository from a network storage system.

Per at least one embodiment, two person control may be involved in the designating and binding of a second repository to the digital data to be transferred, where the first person control arises by using the workflow computing system to select the second repository and the second person control arises by a second user selecting from a database of second repositories, obtaining the second repository (e.g., the hard disc or a portion of the storage system), and communicatively connecting the second repository to the workflow computing system. It is to be appreciated that "two-person control" may involve humans, automated processes or both.

In at least one embodiment, a human verification that a previously selected second repository is configured and ready for the data transfer is accomplished. The human verification desirably utilizes the human readable identifier and any reading device, if any, needed for use with such human readable identifier. The human verification is confirmed manually, semi-automatically, or automatically to the data port device. For example, an operator may communicate the work order identifier and the human readable identifier to the data port device using typed characters, voice commands, scanned images (e.g., scanned bar codes, QR codes or RFID codes) or otherwise.

In at least one embodiment and upon receipt of the work order identifier, the data port device may obtain the previously determined internal identifier for the second repository designated in the work order. The internal identifier may be obtained by the data port device directly from the second repository using the second repository information stored in the database or otherwise available to the data port device. The human readable identifier and the internal identifiers provided to the data port device are verified against the identifiers used to register the second repository in the database or other listing per Operation 106. It is to be appreciated that the data port device may obtain the human readable identifier, the internal identifier or both from the device itself. The data port device may use such obtained data to verify the proper device is selected by comparing the obtained data to the previously generated register data (per Operation 106) or to data obtained directly from the work order itself, or by querying the library and database systems used to store the second repository per Operation 108.

Per Operation 114, if the one or more human readable identifier and internal identifiers for the second repository as designated in the work order and as obtained and provided to the data port device per Operation 112 are verified as correct, the process continues.

Per Operation 116, if one or more of the required identifiers is not verified, the process terminates. In at least one embodiment, upon a termination event arising, the data port device may request resubmission of any human readable and/or internal identifiers designated in the work order. If resubmission is requested, Operations 112-114 are repeated.

Per Operation 118, when the data port device has verified the one or more human readable identifiers and internal identifiers specified in the work order, the transfer of the designated digital data to the second repository commences. The data transfer continues until the entirety of the designated data has been transferred, with the data port device opening a communications port between the workflow computing system and the second repository during the data transfer process. In accordance with at least one embodiment, the data port device is configured to prevent the transfer of data from the workflow computing system to any other repositories other than in accordance with a work order and only while the work order specified data transfer is occurring.

Per Operation 120, upon a transfer of the desired digital data from the first repository to the selected and verified second repository, as per Operation 118, for at least one embodiment, the integrity of the data transferred is determined. One or more data integrity determinations may be accomplished. Such integrity determinations may include, for example, determining whether the entire data set desired to be transferred was actually transferred, determining whether the data transferred and as stored on the second repository is a true and complete copy of the original data stored on the first repository, determining whether any additional data was transferred to the second repository, and one or more of other data integrity verifications commonly known in the art. It is to be appreciated that data integrity verifications may be accomplished using, for example, cryptographic hash functions, such as the MD-5 message digest algorithm. In accordance with at least one embodiment, cryptographic hash values are calculated for the digital data designated to be transferred per the work order both before and after transfer of such digital data to the second repository occurs. The data integrity verification includes a comparison of such cryptographic hash functions. It is also to be appreciated that the granularity of the integrity check of the digital data transferred may vary based on various parameters, such as the type of communications connections arising between the workflow computing system and the second repository, the type of data communicated, the type of devices and/or storage systems comprising the second repository, whether the data is protected by encryption or other anti-piracy measures, whether the data is protected by other anti-corruption measures, and otherwise.

Per Operation 122, when the integrity of the data transferred to the second repository via the data port device is verified, the process ends.

Per Operation 124, the second repository is then released from the data port device and the second repository contains a verified copy of the given digital data and may be used for later data processing or other operations by the workflow computing system, a second workflow computing system, other computing devices or otherwise.

Per Operation 122, when the integrity of the data transferred to the second repository is not verified, the data transfer operation may be repeated, as desired. If desired, the data transfer process is re-accomplished per Operations 112-122, as discussed above. It is to be appreciated, however, that for at least one embodiment the data transfer process may exclude Operations 112-116 and resume instead with Operation 118. The number of attempts, if any, at repeating the data transfer per Operation 126 may be determined in accordance with the work order, real-time based upon manual, semi-automatic or automatic instructions or otherwise. Per at least one embodiment, a work order may authorize only one attempt at repeating a transfer of the digital data to the second repository per any given work order without requiring a new work order being generated.

Per Operation 128, when a verified transfer to the designated second repository cannot be accomplished after any given number of repeat attempts, if any, the process terminates. With termination, a suitable error message may be communicated to the workflow computing system, to the data port device, to the database of second repositories or otherwise indicating that a successful data transfer was not accomplished. Per at least one embodiment, when the integrity of the data transfer cannot be verified, the process may also include the operations of electronically wiping the data from the second repository before the second repository is released from the data port device.

It is to be appreciated that in accordance with one or more embodiments, a physical connection may be established between a second repository and the data port device during a data transfer process. Such physical connection may arise magnetically, mechanically or otherwise and be released upon a verified transfer, as per Operation 124, or upon a wiping of the second repository, as per Operation 128, or otherwise.

Figure 2:
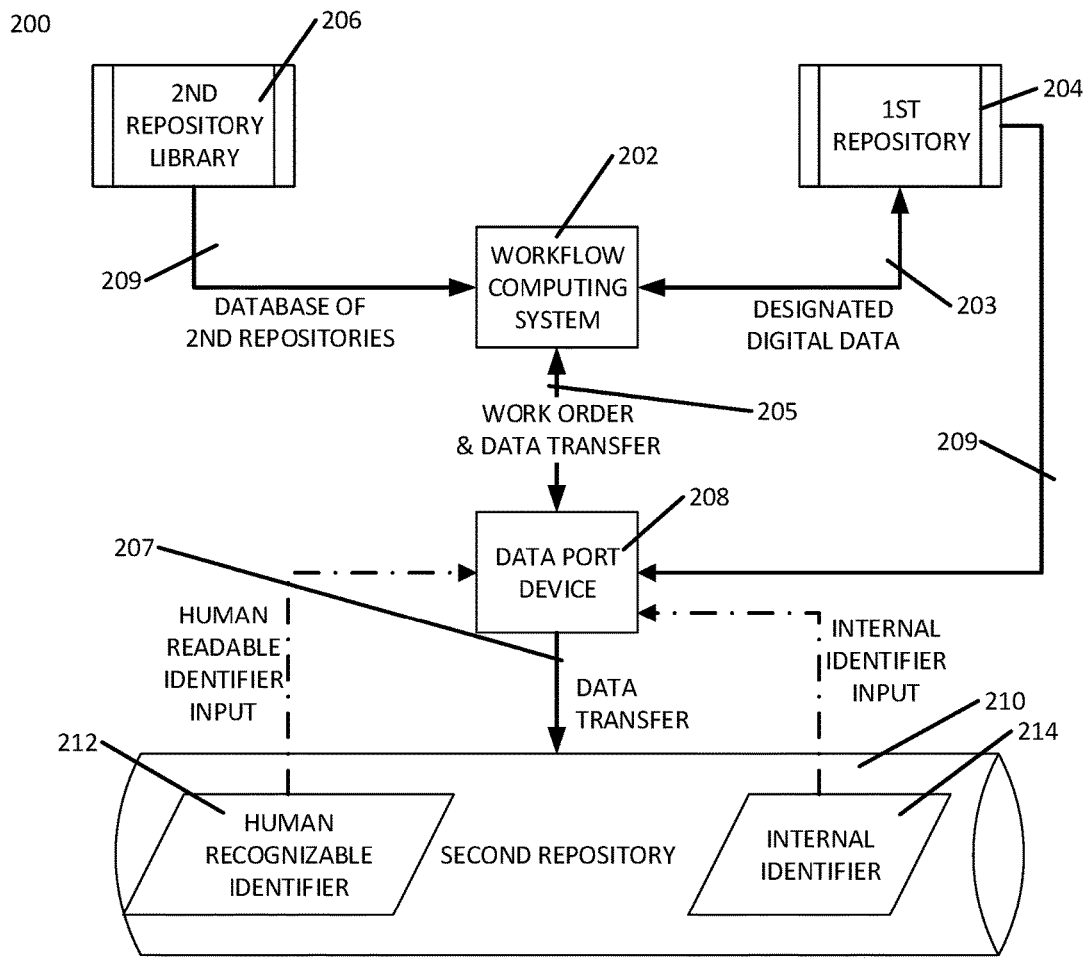
FIG. 2 is a schematic diagram of a system for implementing a secure transfer of digital data from a workflow computing system to a second repository in accordance with at least one embodiment described herein.

Referring now to FIG. 2, in accordance with at least one embodiment, a system 200 for facilitating the above described secure data transfer processes may include a workflow computing system 202. Such workflow computing system may be a computing device such as a single-server, clustered server, blade server, or virtual server operating environment, or possibly a personal computer (PC), a mainframe computer, a distributed computer, an Internet appliance, or other computing devices, or combinations thereof, with internal processing and memory components as well as interface components for connection with external input, output, storage, network, and other types of peripheral devices.

In any embodiment or component of the system described herein, the workflow computing system 202 includes a processor, such as a processor capable of executing multiple threads at the same time in parallel, and a system memory connected by a system bus that also operatively couples various system components. There may be one or more processors operating in a parallel processing environment (for example, a dual-core, quad-core, or other multi-core processing device). It is to be appreciated that at a low level of structural abstraction, the processors execute one or more instructions obtained from an instruction set provided for use in conjunction with the processors. Such instruction set may be stored on the workflow computing system in read only memory, or otherwise. At a higher level of structural abstraction, the processors execute one or more software instructions that are provided as computer executable machine codes, such codes in turn providing instructions for using one or more of the instructions in the instruction set to accomplish one or more calculations or operations performed by the processor. At an even higher level of structural abstraction, it is to be appreciated that the workflow computing system executes operations at various levels of a computing operating system, networking and other models such as those set forth in a multi-kernel model, an Open Systems Interconnection model, a distributed operating system model and otherwise. Such structural components being instantiated in well-known hardware and/or software structures.

A system bus for the workflow computing system may be any of several types of bus structures including a memory bus or memory controller, a peripheral bus, a switched fabric, point to point connection, and a local bus using any of a variety of bus architectures. The system memory includes read only memory (ROM) and random access memory (RAM). A basic input/output system (BIOS), operating system kernel or the like, containing the basic routines that help to transfer information between elements within the computer system, such as during start up, may be stored in ROM or otherwise provided. A cache may be set aside in random access memory (RAM) to provide a high speed memory store for frequently accessed data.

A hard disk drive interface may be connected with the system bus to provide read and write access to a data storage device, e.g., a hard disk drive, for nonvolatile storage of applications, files, and data. Such interface may include an interface to a first repository 204 in which a given set of digital data may be stored temporarily, permanently, persistently or otherwise. Other types of non-volatile memory and/or storage devices may be utilized including but not limited to internal and external solid state storage drives. A number of program modules and other data may be stored on the hard disk including an operating system, one or more application programs, and data files. In at least one embodiment, the hard disk drive may store code associated with the exemplary processes described herein. Note that the hard disk drive may be either an internal component or an external component of the workflow computing system. The hard disk drive may be permanent or removable. In some configurations, there may be both an internal and an external hard disk drive. The hard disk drive may be connected to the workflow computing system directly or indirectly, for example by way of one or more network connections, and may reside locally or remote to the workflow computing system. As used herein, a system is considered remote to a given workflow computing system when it resides on a network uniquely and differently addressable from a network to which the workflow computing system may be connected and which may require the establishment of communicative pathway by way of one or more routers, bridges, gateways, modems or similar devices. At least one wired or wireless communications link 203 may be utilized to establish communications between the workflow computing system 202 and the first repository 204. Such communications link 203 may be established directly, indirectly, over any network topology and between locally or remotely located devices and systems.

The workflow computing system 202 may further include a magnetic disk drive for reading from or writing to a removable magnetic disk, tape, or other magnetic media. The magnetic disk drive may be connected with the system bus via a magnetic drive interface to provide read and write access to the magnetic disk drive initiated by other components or applications within the computer system. The magnetic disk drive and the associated computer readable media may be used to provide nonvolatile storage of computer readable instructions, data structures, program modules, and other data for the computer system.

The workflow computing system 202 may additionally include an optical disk drive for reading data from or writing data to a removable optical disk such as a CD ROM or other optical media. The optical disk drive may be connected with the system bus via an optical drive interface to provide read and write access to the optical disk drive initiated by other components or applications within the computer system. The optical disk drive and the associated computer readable optical media may be used to provide nonvolatile storage of computer readable instructions, data structures, program modules, and other data for the computer system.

A display device, e.g., a monitor, a television, or a projector, or other type of presentation device may also be connected, directly or indirectly, to the system bus via an interface, such as a video adapter/interface. Similarly, audio devices, for example, external speakers or a microphone, may be connected directly or indirectly to the system bus through an audio interface.

In addition to the monitor, the workflow computing system 202 may include other peripheral input and output devices, which are often connected to the processor and memory through the serial port interface that is coupled to the system bus. Input and output devices may also or alternately be connected with the system bus by other interfaces, for example, a universal serial bus (USB), an IEEE 1394 interface ("Firewire"), a parallel port, or a game port, and HDMI, Digital Video Interactive (DVI), wirelessly or otherwise. A user may enter commands and information into the workflow computing system through various input devices including, for example, a keyboard and pointing device, for example, a mouse, a touch screen or otherwise. Other input devices may include, for example, a joystick, a game pad, a tablet, a touch screen device, a satellite dish, a scanner, a facsimile machine, a microphone, a digital camera, and a digital video camera.

Output devices may include, for example, a printer, a plotter, a photocopier, a photo printer, a facsimile machine, a press, and other forms of physical media output devices. In some implementations, several of these input and output devices may be combined into single devices, for example, a printer/scanner/fax/photocopier. It should also be appreciated that other types of computer readable media and associated drives for storing data, for example, magnetic cassettes or flash memory drives, may be accessed by the computer system via the serial port interface (e.g., USB) or similar port interface.

The workflow computing system 202 may operate in a networked environment using logical connections through a network interface coupled with the system bus to communicate with one or more remote devices. The logical connections can include but are not limited to a local area network (LAN) and a wide area network (WAN). Such networking environments are commonplace in home networks, office networks, enterprise wide computer networks, and intranets. These logical connections may be achieved by a communication device coupled to or integral with the computer system. The LAN may use a router or hub, wired or wireless, internal or external, to connect with remote devices, e.g., a remote computer similarly connected on the LAN. The remote computer may be another personal computer, a server, a client, a peer device, or other common network node, and typically includes many or all of the elements described above relative to the computer system.

To connect with a WAN, the workflow computing system 202 typically includes a modem for establishing communications over the WAN. Typically, the WAN may be the Internet. However, in some instances the WAN may be a large private network spread among multiple locations, or a virtual private network (VPN). The modem may be a telephone modem, a high speed modem (e.g., a digital subscriber line (DSL) modem), a cable modem, or similar type of communications device. The modem, which may be internal or external, is connected to the system bus via the network interface. In one or more alternate embodiments, the modem may be connected via the serial port interface. It should be appreciated that the foregoing network connections are exemplary only and other means of and communications devices for establishing a network communications link between the computer system and other devices or networks may be used.

As further shown in FIG. 2, the system 200 includes a data port device 208. As discussed above with regards to at least one embodiment, the data port device 208 may exist as a distinct external hardware and/or software device communicatively coupled to the workflow computing system 202. In another embodiment, the data port device 208 may exist as an internal hardware and/or software device provided in the workflow computing system 202 itself. When external, it is to be appreciated that the data port device 208 includes one or more processors, ROM, RAM, input and output ports, system bus, and other well-known computing and/or communications devices and components (arising in hardware, software or both) which implement the one or more logical operations described herein. The workflow computing system 202 may be connected to the data port device 208 via a communications link 205. The first repository 204 may be connected to the data port device 208 via a communications link 209. Such communications links, 205 and 209 may be established directly, indirectly, over any network topology and between locally or remotely located devices and systems.

Figure 3:
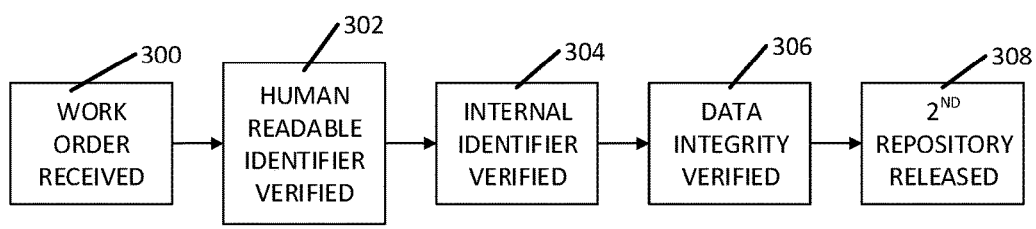
FIG. 3 is a flow chart depicting one embodiment of logical operations executed by a data port device to securely transfer digital data from a workflow computing system to a second repository.

More specifically and per at least one embodiment, the data port device may be implemented as one or more combinations of hardware and software which execute one or more logical operations such as the logical operations shown in FIG. 3. As per the embodiment of logical operations shown in FIG. 3, the data port device is configured to perform the operations of receiving a work order 300, receiving and verifying a human readable identifier 304, receiving and verifying an internal identifier 306, verifying the integrity of data transferred to a second repository 308 and releasing the second repository when the data integrity is verified 310. Other operations not depicted in FIG. 3 may include one or more of the operations described above in conjunction with the various embodiments of FIG. 1, such operations including providing for a data port device 208 that is normally closed with respect to data transfers from the workflow computing system 202 to a second repository 210, and wherein such ports open only when a valid work order has been received and at least two identifiers have been verified, where the identifiers uniquely identify a given second repository. Such logical operations may further include the capability of the data port device directly, or in combination with the workflow computing system, to verify the integrity of a transfer of a pre-identified and given set of digital data to a given second repository. Such logical operations include configuring the data port device such that a given data port(s) is normally closed and is opened only while a transfer of a given set of digital data to a designated second repository occurs.

Further, for at least one embodiment, the logical operations performed by the data port device 208 may include operations of communicatively linking, over a communications link 207, a given second repository 210 to a given workflow computing system 202. Such communication links 207 may be established directly, indirectly, over any network topology and between locally or remotely located devices and systems.

Referring again to FIG. 2, the system 200 also includes at least one second repository 210. As discussed above, the second repository 210 includes at least two identifiers, a human recognizable identifier 212 and an internal identifier 214. As discussed above in conjunction with FIG. 1, the system 200 may include one or more input devices by which the human recognizable identifier 212 associated with a given second repository 210 may be communicated to a second repository library 206 and, in conjunction with a given data transfer, to the data port device 208. The second repository library 206 and database and other information stored therein may be communicatively linked to the workflow computing system 202 over communications links 209. Such communications link 209 may be established directly, indirectly, over any network topology and between locally or remotely located devices and systems.

It is to be appreciated that a reading device utilized to register a given second repository 210 with a repository library 206 may be the same as or different from a reading device utilized to identify a second repository 210 to the data port device 208.

As also shown in FIG. 2, the system 200 may be configured to recognize an internal identifier 214. As discussed above in conjunction with FIG. 1, the hardware and software utilized to recognize an internal identifier 214 for a given second repository 210 may be unique for the type of a given second repository.

In at least one embodiment, the data port device 208 utilizes software instructions to perform its logical operations. Such software instructions are provided in one or more computer data structures, such as data files, and provide computer executable instructions by which the workflow computer system 202, the second repository library 206, the data port device 208 and/or one more combinations thereof may perform those logical operations desired for any given embodiment discussed or otherwise described herein.

In general, the technologies described herein may be implemented as logical operations and/or modules in one or more systems. The logical operations may be implemented by processing devices, such as those described herein above, as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the invention. One implementation of a computer program product provides a non-transitory computer program storage medium readable by a computer system and encoding a computer program. It should further be understood that the described technology may be employed in special purpose devices independent of a personal computer.

The above specification, examples and data provide a description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

The invention claimed is:

1. A method for securely transferring digital data from a first repository to a second repository comprising:
   establishing a first communications link between a data port device and a computer system, wherein the data port device includes at least one communications port configurable for establishing a communications link between a first repository and a second repository;
   receiving at the data port device a work order from the computer, wherein the work order specifies an identifier associated with the second repository and identifies a set of digital data to be transferred from the first repository to the second repository;
   establishing a second communications link between the data port device and a second device;
   determining whether the second device is the second repository identified in the work order; and
   when the result of the determining indicates that the second device is the second repository, further performing the operations of:
   establishing a third communications link between the data port device and the first repository;
   opening the at least one communications port in the data port device to establish a communications path between the first repository and the second repository, wherein the communications path includes the second communications link and the third communications link;

transferring the set of digital data from the first repository to the second repository via the communications path; and determining whether data transferred from the first repository to the second repository satisfies a data integrity requirement.

2. The method of claim 1, wherein the work order specifies at least one first identifier associated with the second repository, and the operation of determining whether the second device is the second repository comprises:

querying the second device for a device identifier;

comparing the at least one first identifier specified in the work order with the device identifier returned by the second device in response to the querying; and when the at least one first identifier specified in the work order matches the device identifier returned by the second device in response to the querying, recognizing the second device as the second repository designated in the work order.

3. The method of claim 2, wherein the at least one first identifier comprises an internal identifier associated with the second repository.

4. The method of claim 2, wherein the at least one first identifier comprises a serial number for the second repository.

5. The method of claim 4, wherein the serial number is hard coded into the second repository so as to be unmodifiable.

6. The method of claim 3, wherein the work order specifies at least one second identifier associated with the second repository, and the operation of determining whether the second device is the second repository comprises:

querying the second device for a second device identifier;

comparing the at least one second identifier specified in the work order with the second device identifier returned by the second device in response to the querying; and when each of the at least one first identifier specified in the work order matches the first device identifier returned by the second device and the at least one second identifier specified in the work order matches the second device identifier, as returned by the second device in response to the querying, recognizing the second device as the second repository designated in the work order.

7. The method of claim 6, wherein the at least one second identifier comprises a first human recognizable identifier.

8. The method of claim 7, wherein the operation of querying the device for a second device identifier comprises:

scanning the second device for a second human recognizable identifier.

9. The method of claim 8, wherein the first human recognizable identifier and the second human recognizable identifier are the same and comprise at least one of a bar code, a quick response code and a radio frequency identification tag.

10. The method of claim 1, wherein the second repository is a hard disc drive.

11. The method of claim 1, wherein the computer system comprises a workflow computing system.

12. The method of claim 1, wherein the second communications link between the data port device and a second device comprises a direct, hard-wired connection.

13. The method of claim 1, wherein the operation of determining whether data transferred from the first repository to the second repository satisfies a data integrity requirement comprises:

calculating, for a first set of the digital data stored in the first repository pre-transfer, a pre-transfer cryptographic hash function;

calculating, for a second set of digital data stored in the second repository post-transfer, a post-transfer cryptographic hash function;

comparing the pre-transfer cryptographic hash function with the post-transfer cryptographic hash function; and when the comparison of the pre-transfer and post-transfer cryptographic hash functions match, closing the at least one communications port in the data port device.

14. The method of claim 13, wherein the pre and post transfer cryptographic hash functions are calculated using an MD-5 message digest algorithm.

15. A method for securely transferring digital data from a first repository to a second repository comprising:

receiving a second repository into a repository library;

marking the second repository with a human recognizable identifier;

determining an internal identifier associated with the second repository;

registering the second repository in a database, wherein the database identifies the second repository using the human recognizable identifier and the internal identifier;

communicating the database to a workflow computing system;

selecting, using the workflow computing system, the second repository as a destination for a transfer of a set of digital data from a first repository;

establishing a first communications link between a data port device and the workflow computing system, wherein the data port device includes at least one communications port configurable for establishing a communications link between the first repository and the second repository;

receiving at the data port device a work order from the workflow computing system, wherein the work order specifies the second repository based on the human recognizable identifier and the internal identifier associated therewith in the database, and the work order identifies the set of digital data to be transferred from the first repository to the second repository;

establishing a second communications link between the data port device and a second device;

determining whether the second device is the second repository identified in the work order; and when the result of the determining results in an identification of the second device as the second repository, further performing the operations of:

establishing a third communications link between the data port device and the first repository;

opening the at least one communications port in the data port device to establish a communications path between the first repository and the second repository, wherein the communications path includes the second communications link and the third communications link;

transferring the set of digital data from the first repository to the second repository via the communications path; and determining whether the set of digital data transferred from the first repository to the second repository satisfies a data integrity requirement.

16. The method of claim 15, wherein the operation of determining whether the second device is the second repository identified in the work order comprises:
- querying the second device for an internal identifier; and
- comparing the internal identifier returned by the second device with the internal identifier specified in the work order.

17. The method of claim 16, wherein the operation of determining whether the second device is the second repository identified in the work order comprises:
- querying of the second device for a human recognizable identifier;
- comparing the human recognizable identifier returned by the second device with the human recognizable identifier specified in the work order; and
- identifying the second device as the second repository when the internal identifier and human recognizable identifier returned by the second device match the internal identifier and human recognizable identifiers specified in the work order.

18. The method of claim 16, wherein the human recognizable identifier used to mark the second repository comprises at least one of a bar code, a QR code and an RFID tag.

19. The method of claim 17, wherein the internal identifier associated with the second repository comprises a serial number for the second repository, wherein the serial number is hard coded into the second repository so as to be unmodifiable.

20. The method of claim 15, wherein the second repository is a hard disc drive.

* * * * *